United States Patent [19]

Boyers et al.

[11] Patent Number: 4,616,987
[45] Date of Patent: Oct. 14, 1986

[54] INTERNAL BORE IMPRESSION TOOL

[75] Inventors: Charles L. Boyers, Carmel; John W. Finlayson, Ventura, both of Calif.

[73] Assignee: Vetco Offshore Industries, Inc., Ventura, Calif.

[21] Appl. No.: 745,053

[22] Filed: Jun. 17, 1985

[51] Int. Cl.⁴ .......................... B29C 3/00; B30B 5/02
[52] U.S. Cl. .............................. 425/89; 249/65; 425/405 R; 425/DIG. 19; 425/DIG. 44; 73/151
[58] Field of Search ............... 249/65; 425/89, 405 R, 425/405 H, DIG. 19, DIG. 44; 73/151; 126/444, 450; 324/216; 252/62.52

[56] References Cited

U.S. PATENT DOCUMENTS

| | | | |
|---|---|---|---|
| 2,587,476 | 2/1952 | Huhn | 324/216 |
| 2,682,032 | 6/1954 | Dehn et al. | 324/216 |
| 3,216,060 | 11/1965 | Trojanowski et al. | 425/89 |
| 3,575,237 | 4/1971 | Malone | 166/152 |
| 3,581,816 | 6/1971 | Malone | 166/187 |
| 3,664,799 | 5/1972 | Wallick et al. | 425/405 H X |
| 3,862,047 | 1/1975 | Weltman et al. | 324/216 X |
| 3,916,871 | 11/1975 | Estes et al. | 126/444 |
| 3,969,937 | 7/1976 | Barrington et al. | 73/151 |
| 3,978,398 | 8/1976 | Molina | 252/62.52 X |
| 4,057,383 | 11/1977 | Bettonica | 425/405 H |

Primary Examiner—J. Howard Flint, Jr.
Attorney, Agent, or Firm—Joseph R. Dwyer

[57] ABSTRACT

A tool (10) for taking an impression of an area of the internal bore of a tubular member (16) or a joint between two such members comprising means for directing a casting compound between two flexible membranes (20, 22) which are then forced outwardly so that the outer membrane (22) engages the area to be inspected within a bore where the compound forms a resilient mold (cast). When the force against the membranes and mold is removed, the membranes and mold collapse allowing the mold and tool (10) to be retrieved out the bore.

The tool (10) carries casting compound in two parts unmixed to the area to be inspected where a selected amount of working fluid (60) under preselected pressure from a fluid source (18) of a selected volume will open a valve (42) then force the two parts to be mixed and directed between two flexible membranes (20, 22). The remainder of the working fluid (60) under pressure from the fluid source will then be directed via another valve (54) behind the membranes to inflate (expand) the two membranes (20, 22), with the compound therebetween, against the area to be inspected. This also distributes the compound uniformly within the membranes. After the compound has cured, the working fluid (60) under pressure holding the membranes expanded will be directed out by another valve (54) from behind the membranes, allowing the membranes and mold to collapse.

The fluid in the fluid source is pressurized by a pressure source outside the tool, such as fluid (18) in a drill string.

The invention also disclosed is a method of taking an impression of an area to be inspected.

14 Claims, 23 Drawing Figures

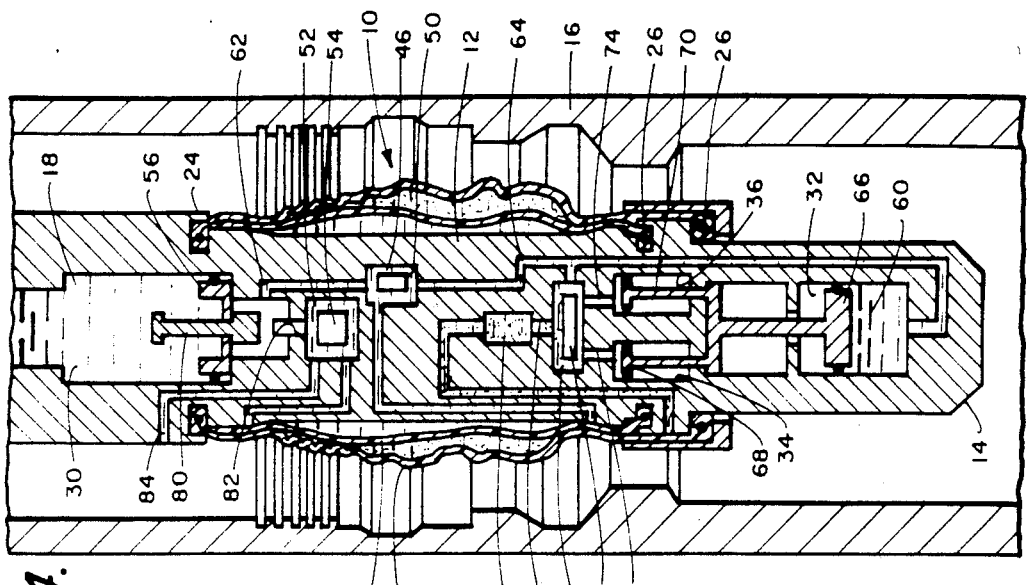

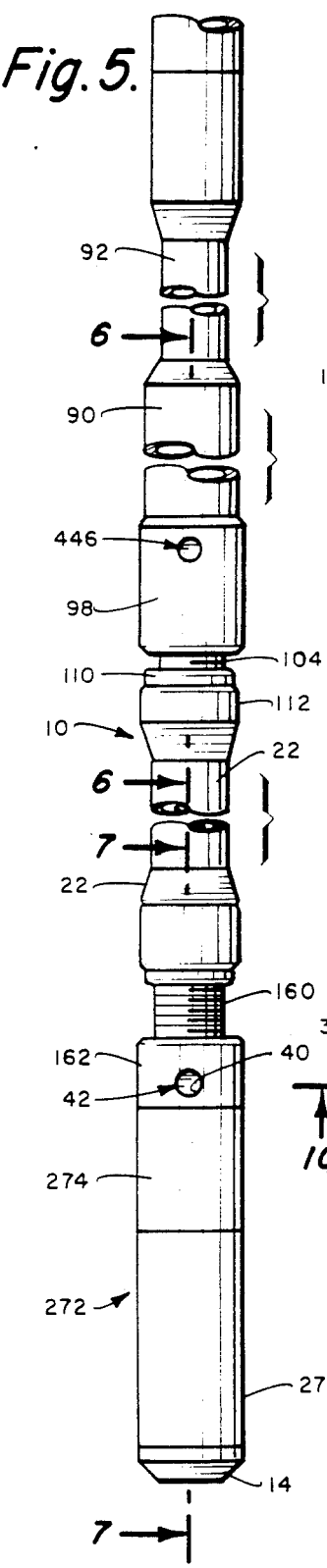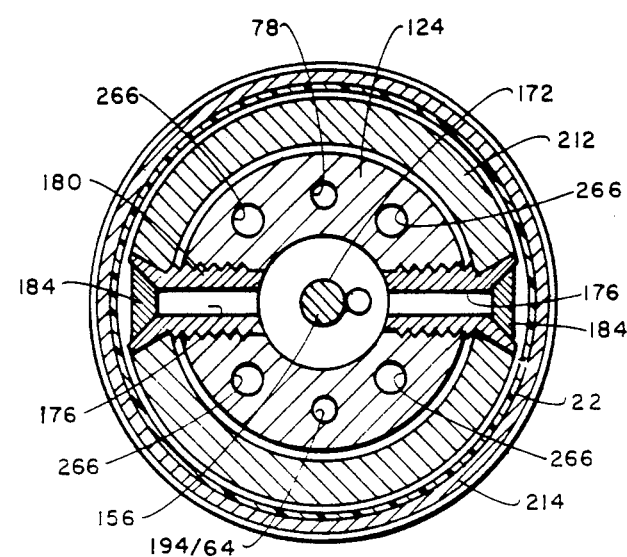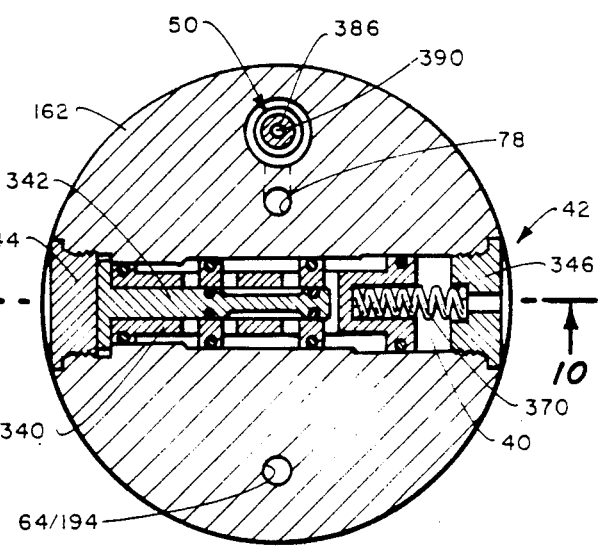

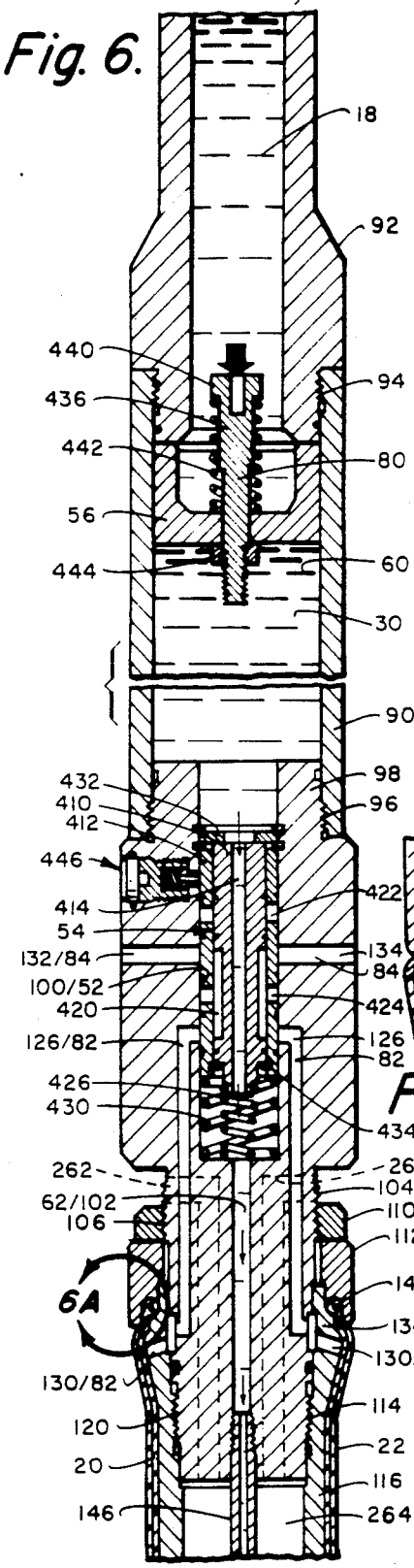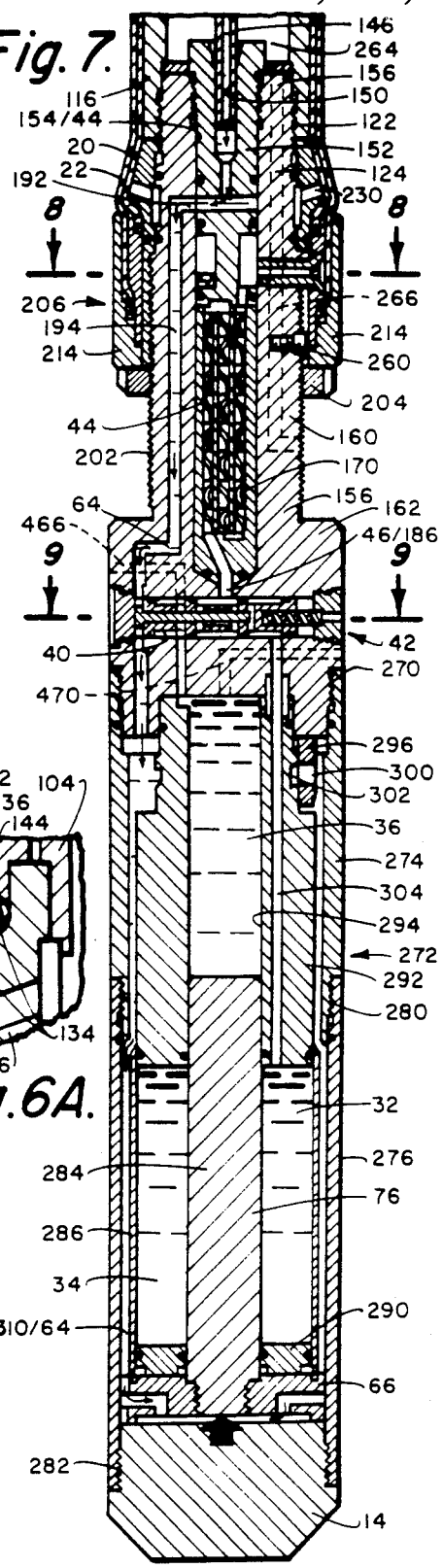
Fig. 6.
Fig. 6A.
Fig. 7.

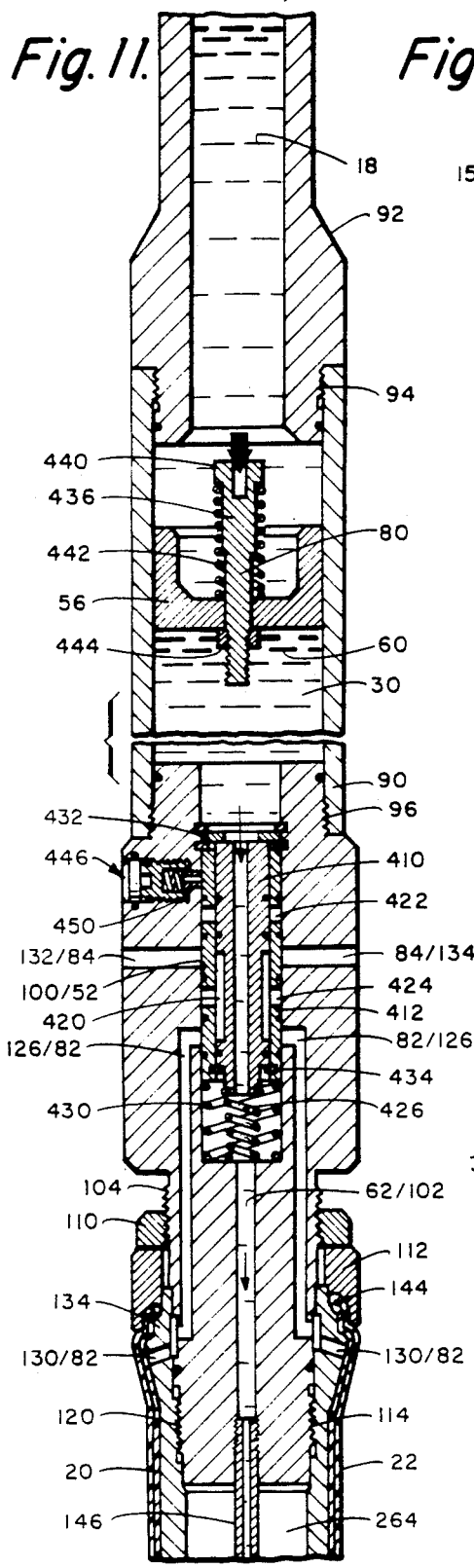
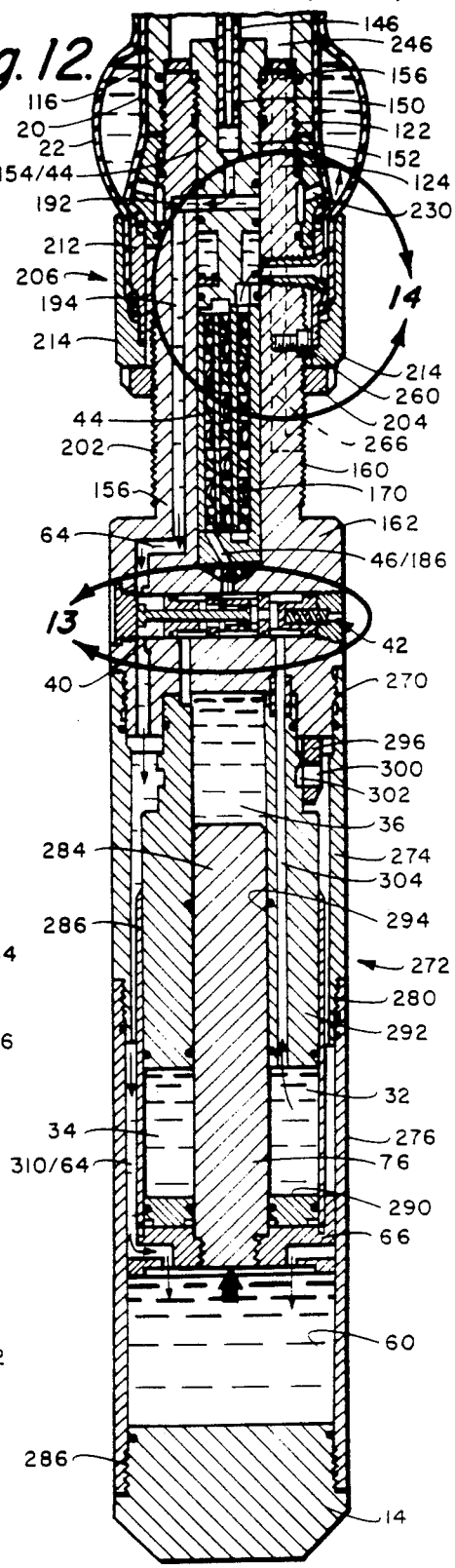
Fig. 11.
Fig. 12.

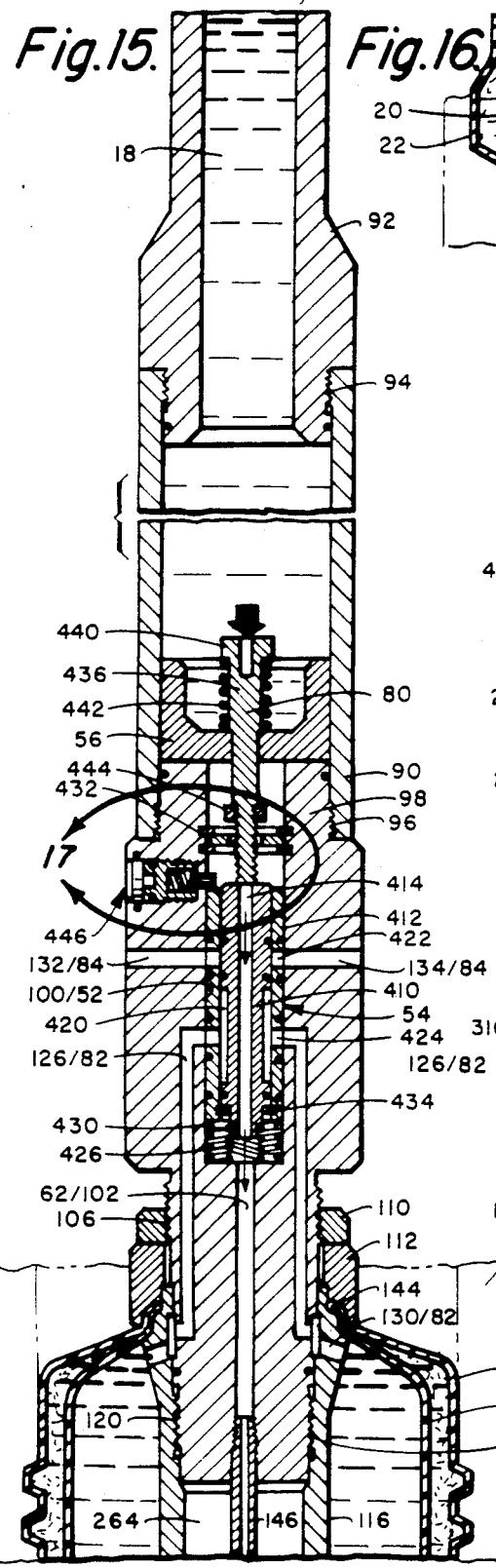
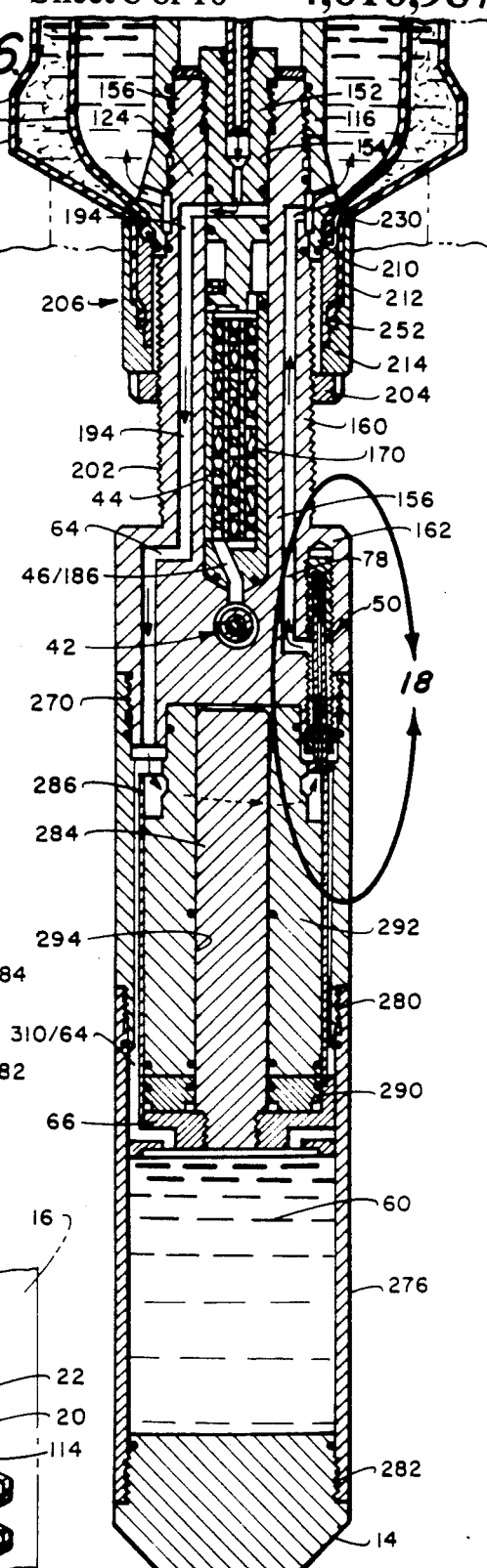
Fig. 15.
Fig. 16.

4,616,987

INTERNAL BORE IMPRESSION TOOL

BACKGROUND OF THE INVENTION

This invention relates to a tool for taking an impression of a selected area in an internal bore of a tubular member and is especially adapted to take such an impression where the selected area of the bore is remote and in a hostile environment, such as in a string of production or drilling risers used in offshore drilling and production or in casing or tubing within the well itself, whether subsea or onshore.

In the drilling and production of oil and gas wells, there has been a long existing need for inspecting the internal bore of tubular members for broken threads, cracks, holes, scored seal surfaces, or perhaps an incorrectly threaded joint between two members, without returning the member or members to the surface of the water, in the case of a subsea well, or to the land in the case of an onshore well. Heretofore, such an inspection under such adverse conditions was virtually impossible. High water pressure, the remoteness of the area from the operator, vertical surfaces and their condition are but a few of the problems involved in such an inspection. As a result, many hours, days, and often weeks were spent fishing for obstacles or retrieving whole strings of tubular members because of an unidentified or incorrectly identified problem.

In addition, it is apparent that for such an inspection to be made under such adverse conditions, the device must be insensitive to ambient pressure, it must be capable of being operated remotely, whatever medium is used to make the impression, it must be capable of being separated from the member being examined, and it must not contaminate the member nor should the fluid and chemicals used react with the medium or with the member being examined. Also, the member and device must be capable of retrieval out of the bore of the member being inspected.

There are a number of prior art tools to take an impression of a bore, such as shown in the U.S. Pat. No. 3,916,871, where an elastically hardenable casting plastic is cast into a plug between inflatable dams. See also U.S. Pat. Nos. 3,862,047 and 3,978,398 which utilize a mixture such as rubber with magnetic particles as a recording medium.

However, none of the prior art patented devices provide a method or means capable of meeting the demands imposed on the device by such adverse conditions.

SUMMARY OF THE INVENTION

This invention which meets the criteria set forth above, comprises a tool having means for directing a casting compound between two flexible membranes which are then forced outward. The outer membrane presses against the area to be inspected within a bore where the compound is cured and forms a resilient mold (cast). When the force against the membrane and mold is removed, the membranes and mold collapse allowing the mold and tool to be retrieved.

The tool carries casting compound in two parts unmixed to the area to be inspected where a selected amount of working fluid under pressure from a fluid source of a selected volume will then force the two parts to be mixed and directed between two flexible membranes. The remainder of the working fluid under pressure from the fluid source will then be directed behind the membranes to inflate (expand) the two membranes, with the compound therebetween, against the area to be inspected. This also distributes the compound uniformly within the membranes. After the compound has cured, the working fluid under pressure holding the membranes expanded will be directed out from behind the membranes, allowing the membranes and mold to collapse.

The fluid in the fluid source is pressurized by a pressure source outside the tool, such as fluid in a drill string pressurized by a drilling rig pump and the means for directing the working fluid in the tool is a valving system.

An adaptor system is also provided for taking the impression of large bore tubular members, such as wellheads.

BRIEF DESCRIPTION OF THE DRAWINGS

FIG. 3 illustrates the membranes having been forced into engagement with the internal bore area to be profiled, taking an impression thereof by curing the casting compound, FIG. 4 illustrates the membranes and the mold (cured casting compound) in its collapsed position ready to be retrieved to the surface, FIG. 5 is an elevational view of sections of the actual impression tool shown schematically in the previous figures, FIGS. 6 and 7 are cross-sectional elevational views of the tool, taken along lines 6—6 and 7—7 of FIG. 5, showing the inner details of the valving systems, the various fluid chambers, the double membranes, etc., FIG. 6A is an enlargement of the area encircled by the arrow 6A of FIG. 6A, FIG. 8 is a cross-sectional view taken along line 8—8 of FIG. 7 showing the flow passage and bypass ports and control port for the casting compound to enter the double membranes, FIG. 9 is a cross-sectional view taken along line 9—9 of FIG. 7 of the isolation and mix sequence valve, FIGS. 11 and 12 illustrate the tool in intermediate stage of operation with the double membranes being filled.

DETAILED DESCRIPTION

Figure 2:
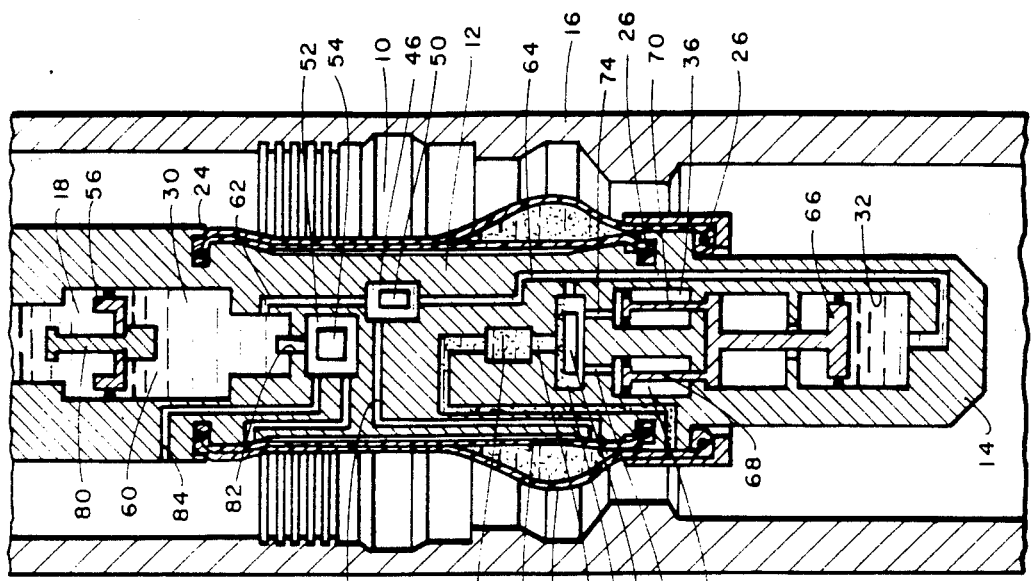
FIG. 2 illustrates casting compound having entered the space between the double membranes.
Figure 1:
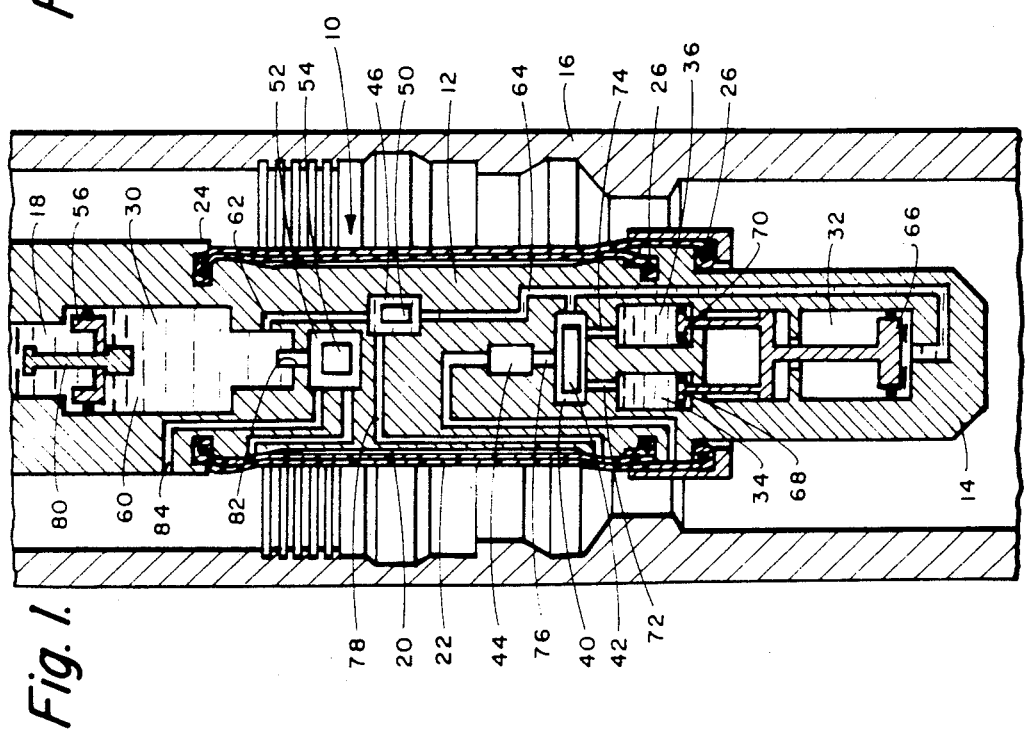
FIG. 1 illustrates the tool of this invention having entered a pipe and located adjacent its internal bore area to be profiled.

FIGS. 1-4 are simplified illustrations showing the operation of the impression tool, identified in its entirety as 10, while FIGS. 5-21 illustrate an actual tool with the various valves and pistons for the proper operation of this impression tool.

Turning first to FIGS. 1-4, it can be seen that the impression tool 10 comprises a main tool body member 12 with a lower bull nose 14 for entering restricted openings for profiling selected areas of equipment, such as areas of the inner bore or pipes or conduits 16 used in the oil and gas subsea well drilling and production operations. Although not shown in these first four figures, the impression tool is capable of being suspended by drill pipe and is operated by fluid under pressure, which is shown as 18, from a suitable source.

The tool body member 12 is provided with double overlapping inner and outer membranes 20 and 22, secured at their respective top and bottom ends 24 and 26. The main body member is also provided with a plurality of cavities which form piston chambers 30 and 32, reservoirs 34 and 36 for the resin and catalyst, an isolation/-mix valve chamber 40 with an isolation/mix valve 42 therein, a mixing chamber 44 for mixing the resin and catalyst, sequence valve chamber 46 with a sequence valve 50 therein, a dump valve chamber 52 with a dump valve 54 therein, and a plurality of passages connecting these chambers and reservoirs to introduce the casting compound (mixed resin and catalyst) between the double membranes 20 and 22 to urge the double membrane with casting compound in between outwardly to form an impression (mold) of the area in question, and then to collapse the membranes and mold to allow retrieval of the tool. The various valves and their operations which divert the various fluids at the appropriate time within the main body member were omitted to simplify the description of the operation of the impression tool.

More specifically, the tool body member contains a first or isolation piston 56 moveable in piston chamber 30 by the pressurized drill pipe fluid 18. A second or working fluid 60 in the piston chamber 30, also referred to as the working fluid reservoir, separated by the isolation piston 56, is forced through passage 62 through the sequence valve chamber 46 and through a second passage 64 into the second piston chamber 32, moving a reservoir compression piston 66 and reservoir pistons 68 and 70 in a direction to urge the resin and catalyst out of reservoirs 34 and 36 and into passages 72 and 74, through the isolation/mix sequence valve chamber 40, through passage 76, and into the mixing chamber 44. This flow of working fluid will continue until the pistons 68 and 70 have travelled their respective full strokes. At this time, the casting compound has been fully introduced between the two inner and outer membranes 20 and 22, as shown in FIG. 2. Since the reservoir compression piston 66 has also travelled its full stroke and has tripped sequence valve 50 to the bag inflation position, continued movement of the isolation piston 56 will divert the remainder of the working fluid 60 through an alternate passage 78 behind the inner membrane 20 to force both membranes outwardly. This operation also distributes the casting compound uniformly and forces the outer membrane 22 into contact with the pipe bore. At the end of its stroke, isolation piston 56 stops and a dump valve actuator 80 continues stroking and cocks the dump valve 54. Pressure is maintained behind the membranes until the casting compound is cured. This is shown in FIG. 3.

After the casing compound has been cured, and an impression (mold) of the area in question has been made, pressure of the working fluid 18 is reduced and dump valve actuator 80 retracts and allows dump valve 54 to go to its dump position. The working fluid 60 behind the membranes is allowed to escape out of the tool through passage 82, dump valve chamber 52 and passage 84, allowing the membrane to collapse so that the tool can be withdrawn. The isolation piston 56 carries the dump valve actuator 80.

Turning now to FIGS. 5-7 where an actual tool is illustrated, it can be seen that the main tool body member 12 is in several sections.

Tool Body Member

The first body section of the tool body member is a top body section 90 which is a hollow tubular member or pipe internally threaded at both ends. The top end is shown threadably connected to a drill pipe adaptor 92 as at 94 and the bottom end is threadably connected as at 96 to a second body section 98. The drill pipe adaptor is connected in the conventional manner to the lower one of a string of drill pipe for lowering the tool to the area to be examined. The top body section 90 is the piston chamber 30 and contains the isolation piston 56 which separates the fluid under pressure 18 in the drill pipe adaptor 92 from the working fluid 60. Those skilled in the art will recognize that utilizing a tubular member, such as 90, for the top body section, the length of the tubular member, and therefore the amount of working fluid, can be selectively varied.

The second body section 98, while having approximately the same diameter as the top body section, is thicker walled by reason of the narrower axial bore 100 therethrough. This bore is the dump valve chamber 52 and contains the dump valve 54 axially slideable therein. This dump valve chamber 52 is in open communication with a narrow axial passage 102 which is part of the passage 62 connecting the dump valve chamber 52 with the sequence valve chamber 46. This second body section has a reduced lower end section 104 which is externally threaded as at 106 to receive a threaded nut 110 and a membrane retainer 112. The reduced section 104 is also provided with a second set of external threads 114 which connect a third body section 116 which, like the top body section, is a long tubular member, internally threaded at or near each end, to be threadably connected as at 120 to the second body section, and as at 122 to still another lower body section 124. The third body section 116 is referred to as the impression support tube.

The second body section 98 also has a pair of passages 126 which extend from the dump valve chamber 52 to a pair of passages 130 in the third body section 116. The latter two passages are essentially in a radial direction and communicate the dump valve chamber 52 with the area between the double membranes and the outside wall of the third body section. These passages correspond to the passages 82 previously described. The second body section is also provided with a pair of transverse passages 132 which communicate the dump valve chamber 52 to the outside, which corresponds to passage 84 previously described.

The top end of the third body section 116 is thickened to produce a larger outer diameter, and then tapered and provided with a pair of inward grooves 134 near its end to cooperate with upper membrane retainer sleeve 112 and threaded capture nut 110 to contain the tops of the inner and outer membranes. More specifically, as shown in FIG. 6A, the grooves 134 together with grooves 136 in the retainer sleeve 112, form a precise recess to contain an O-ring 144. The top ends of the inner and outer membranes 20 and 22 are wrapped around the O-ring 144, and together are slipped over the top of the third body section 116. The upper membrane retainer sleeve 112 is then lowered over the membrane ends and O-ring 144 and the threaded nut 110 is then turned and tightened against the upper membrane retainer sleeve 112 to squeeze the O-ring 144 to retain the membranes in the recess. An alternative approach uses a continuous doubled over sleeve to replace 22 and 20. In this case, O-ring 144 is placed between the two membranes which are situated one inside the other.

Finally, the lower end of the axial passage 102 is threadably connected to a tube 146 which extends the length of the third body section and into an axial bore 150 in a plug 152 threadably inserted in a larger axial bore 154 in a fourth body section 156. Bore 154 corresponds to the mixing chamber 44 in FIGS. 1-4. This fourth body section 156 comprises a reduced upper portion 160 and an enlarged lower portion 162, the latter being essentially the diameter of the remainder of the tool. (See FIG. 14.) The larger axial bore 154, being the mixing chamber 44, contains a mixer 170 which is attached to and held in place by the plug 152. The plug has a reduced radius 172 and a short passage 174 to form the passage 76 from the mixer. The reduced radius is in open communication with bores 176 in a plurality of threaded inserts 180. Each insert has a flared head 182 outside the fourth body member and is located in such a way that casting compound from the mixer will be introduced between the inner and outer membranes. Each flared head also has a check valve-like plug 184 which acts as a one way valve to keep contaminants out of the mixing chamber and to prevent the membranes from extruding into passage 176 because the mixing chamber is full of air when the tool is being positioned. The lower end of the axial bore 154 (FIG. 7) (mixing chamber) is open to the isolation/mix sequence valve chamber 40 by way of a short passage 186, corresponding to passage 46. This chamber 40, as shown in the drawings, is a transverse bore to contain the isolation/mix valve 36.

Figure 14:
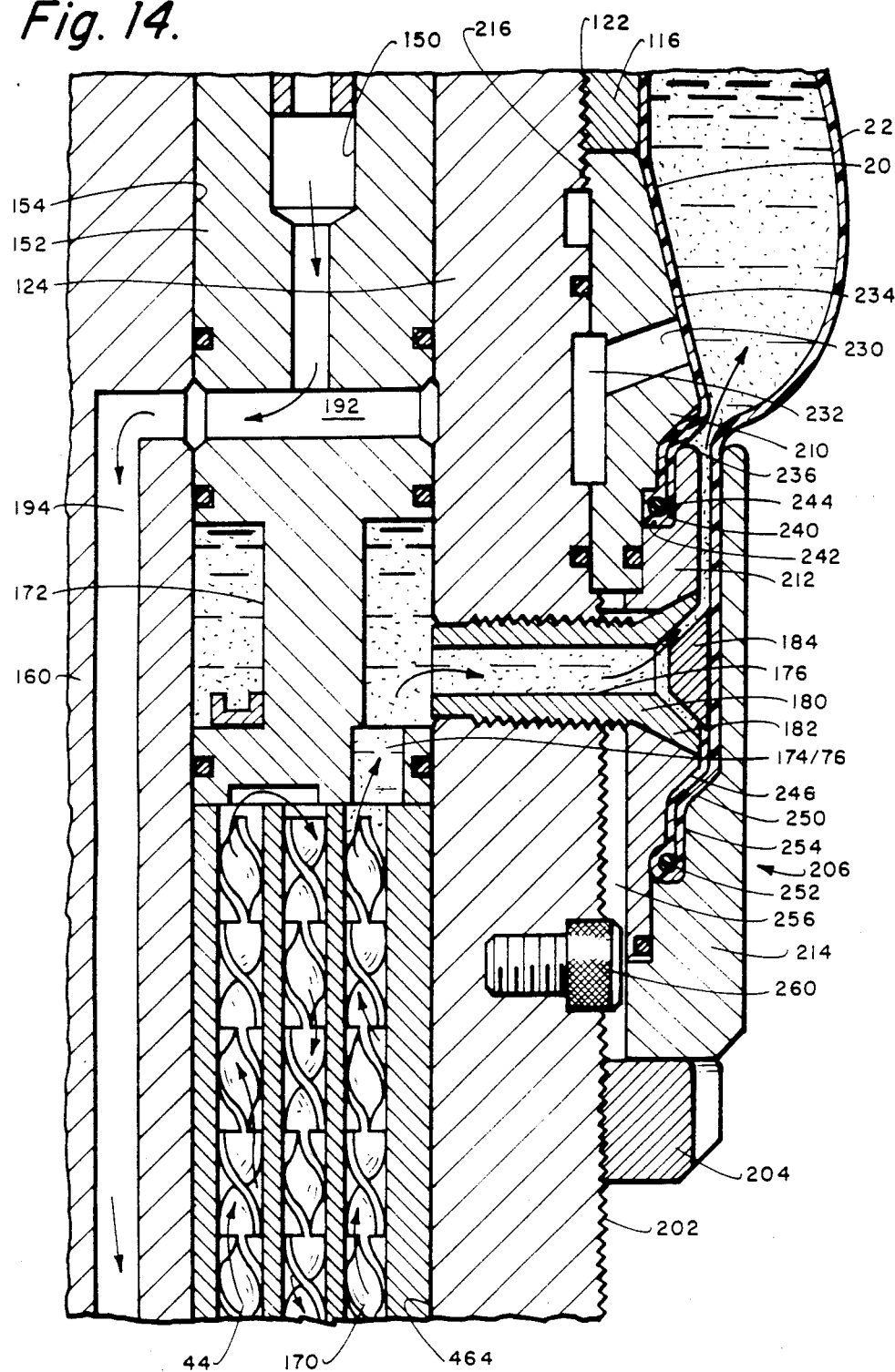
FIG. 14 is an enlargement of the area encircled by the arrow 14 in FIG. 12 to show the details thereof and corresponds to the showing of the flow passage in FIG. 8, FIGS. 15 and 16 illustrate the tool with the double membranes having been fully expanded against the pipe bore to be profiled and the position of the various valves and pistons at this time.

As shown in FIGS. 7 and 14, the axial bore 150 in plug 152 is open to a transverse bore 192, to a vertical internal passage 194 in the reduced portion 160 through one end of the isolation/mix valve chamber 40 at the lower end of the enlarged lower portion 162 and ultimately into the sequence valve chamber.

This latter series of passages corresponds to the passage 64 described in FIGS. 1-4. The passages are separated from the inlet to the mixer by the isolation/mix valve 36 which will be described later.

The reduced upper portion 160 of the lower body section 124 is externally threaded at 122 to be connected to the third body section 116, and additionally externally threaded at 202 (FIG. 14) to receive a threaded lower membrane capture nut 204 which retains a membrane retainer assembly 206. This assembly 206 comprises three rings 210 (inner membrane retainer sleeve), 212 (inner membrane capture sleeve) and 214 (outer membrane capture sleeve) telescoped over the reduced upper section in order to retain the lower end of the membranes and position the latter to communicate the casting compound from the mixer 170 to the space between the membranes.

The first ring 210 is conically shaped, internally threaded at 216, to engage the external threads on the lower body section 124 which engage the threads 122 on the body section 116. The ring 210 has an essentially radial passage 230 connecting a circumferential groove 232 with the inner side of the inner membrane. The ring 210 is first tapered outwardly to form a conical surface 234, which acts to force the casting compound away from the ends of the membranes where it would naturally collect, but would be ineffective in making a usable impression, then inwardly towards its lower end, and provided with a downwardly facing surface 236 formed by a shoulder which cooperates with an upwardly facing surface 240 on a shoulder on the middle ring 212. The space or recess 242 provided by these surfaces and shoulder contains resilient O-ring 244. The lower end of the inner membrane is wrapped around the O-ring to sealingly contain the membrane between the surfaces 236 and 240. The lower end of this middle ring 212 is also shouldered similar to the first ring to provide a downwardly facing surface 246 to cooperate with an upwardly facing surface 250 formed by a shoulder on the outer protector ring 214 to contain a second resilient O-ring 252 in a recess 254. The lower end of the outer membrane is wrapped around the O-ring 252 to sealingly hold the outer membrane within the surface 246 and 250. Outer ring 214 extends upwardly to the top of the middle ring to encompass and protect the insert 180 and plug 184. Suitable space is provided between the outer ring 214 and the middle ring 212 to allow the casting compound to pass through the radial bore 176 outwardly passed the plug 184 and into the space between the two membranes. Finally, in this assembly 206, the two rings 210 and 212 each have a key groove 256 which cooperates with an anti-rotation key (set screw) 260 to prevent rotation of the rings.

To allow a minor amount of flow along the tubulars being profiled to continue without disturbing the membranes, the reduced section 104 of the third body section 116, and the reduced upper portion 160 of the fourth body section 124, is provided with a plurality of bypass passages 262 which communicate an area (bore) 264 within the body section 116 to ambient pressure. This area 264 is also connected to ambient pressure through a plurality of bypass passages 266 in the second body section 98 allowing for fluid flow through the tool. See FIGS. 6, 7 and 8.

The lower end of the fourth body section is externally threaded at 270 to connect a two piece tubular body 272 thereto. This two piece tubular body comprises an upper tube 274 or pipe and a lower tube 276 or pipe threadably connected approximately midway by internal and external threads 280. The lower tube is also internally threaded at 282 to threadably connect the bull nose section 14 thereto.

This tubular body and bull nose form the lower piston chamber 32, contains the reservoir compression piston 66, as well as the two reservoirs 34 and 36. The resin reservoir 34 is formed by a central piston rod 284, threadably attached to piston 66, an outer cylindrical sleeve 286, a sealing washer 290 on its lower end (shown resting on the piston), and an inner cylinder 292 over which the outer sleeve 286 telescopes. This inner cylinder 292 is axially centrally bored at 294 to slideably receive the piston rod 284 and with the lower enlarged end 162 of the third body section forms the catalyst reservoir 34. This inner cylinder is attached to the lower portion 162 of the third body section by a downwardly extending integral lip 296 and a set screw (not shown) in bore 300 which engages a groove 302 in the inner cylinder. Thus, upward movement of the reservoir compression piston 66 will force the resin through an axial passage 304 in the inner cylinder 292, which in turn communicates with the isolation/mix valve chamber 40. Similarly, the catalyst reservoir 36, upon movement of the piston rod 284, will force the catalyst into the isolation/mix sequence valve chamber 40 via an axial passage 306 (FIGS. 10 and 13) in the fourth body member. Again, like the upper top section, the use of two tubular members allows variation in the size of the two reservoirs by a selection in the length of either one or both of the tubular members.

Finally, the inner cylinder 292 and outer sleeve 286 are spaced from the inner wall of the tubular body to provide a passage 310 for the working fluid from the passages to reach the under side of the piston so that the working fluid will urge the piston upwardly to discharge the two reservoirs. Passage 310 forms part of passage 64.

Figure 21:
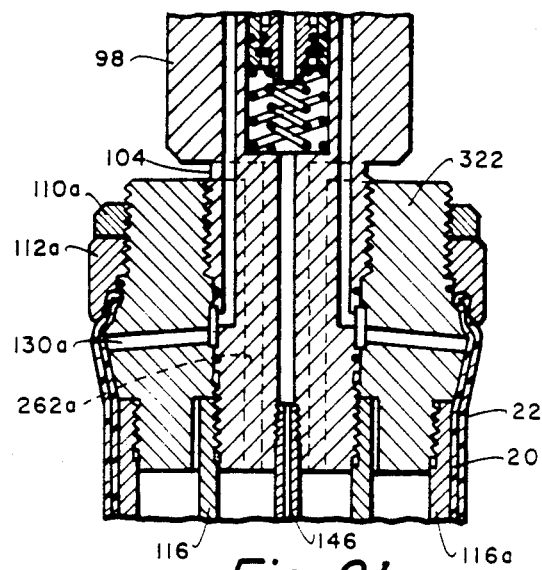
FIGS. 21 and 22 illustrate a modification of the impression tool for taking an impression of large bores such as the wellhead itself.
Figure 22:
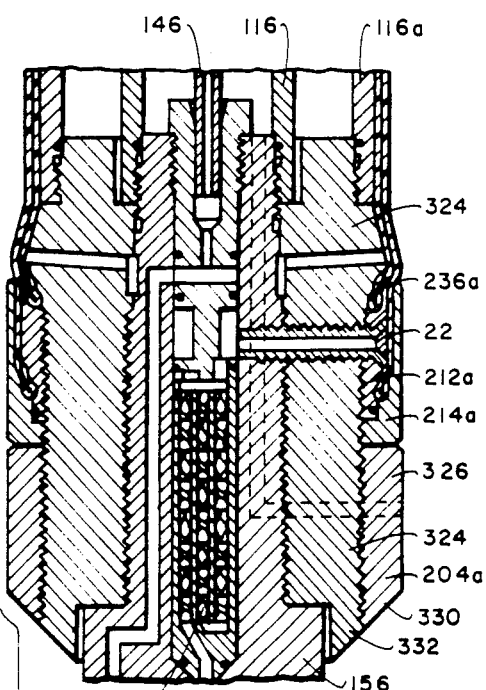

Turning now to FIGS. 21 and 22 which show a modification of the impression tool to enable taking an impression of larger diameter pipes than shown previously, such as the inner bore of a wellhead. In this embodiment, the reduced lower end section 104 of the second body section 98 is provided with an internally threaded sleeve 322 with an outer profile to match the outer profile of the third body section 116 to accommodate the threaded nut 110a and the membrane retainer 112a. The third body section 116 no longer has the previously described outer taper and grooves and is simply a uniform walled tubular member threaded at both ends to be attached to the second body and fourth body members. The sleeve 322 is externally threaded on its lower portion to threadably receive the second outer tubular body section 116a which performs the same function as the threaded body section 116. All other parts, such as membrane retainer 112a, thread nut 110a, passages 130a and 262a, etc., were given the suffix a or b to indicate their similar function in this embodiment to simplify this description. This will also apply to the parts shown in FIG. 22.

FIG. 22 shows the lower end of the impression tool as modified. The reduced portion upper portion 160 of the fourth body section 156 is provided with threaded sleeve 324. The upper sleeve 324 is profiled as at 236a similar to ring 210 to accommodate the inner membrane 20 and cooperate with a middle ring 212a and outer protector ring 214a. The threaded nut 204a, however, is provided with a downwardly facing landing surface 330 as an extension of a landing surface 332 on the sleeve 324. Landing surfaces 330 and 332 are adapted to seat the tool on a landing profile on the inner bore of the wellhead when this embodiment of the tool is used. Those skilled in the art will recognize such landing surfaces and landing profiles.

Thus, having described the impression tool in some detail, reference will be made to the various sections, and then the working operation of the tool will be described.

Membrane

A significant feature of the impression tool is the use of double membranes 20 and 22 to obtain the casting of the area in question. This allows impressions to be taken in any kind of environment that the membranes will survive. By using an outer membrane 22, the casting compound is separated from the equipment being examined and would not contaminate it. Also, the fluids and chemicals in the equipment being examined can not react with the casting compound. The outer membrane 22 also acts as the primary means of retracting the finished molding from the equipment being examined and allows it to be withdrawn from a restricted opening.

The inner membrane 20 separates the working fluid 60 from the casting compound and causes the casting compound to assume a uniform thin distribution so that a large area can be profiled with a small amount of casting compound. By using the inner membrane 20 in conjunction with the working fluid 60, it is possible to have a tool that allows the casting compound to be retracted into an area that would otherwise be occupied by additional casting compound or structure.

In an actual tool, the inner and outer membranes 20 and 22 are one continuous piece of 10 mil polyurethane rubber. The elastic properties of the membranes require that the tool be volume limited rather than pressure limited. This required the use of the working fluid reservoir 30 and an isolation piston 56 to limit the expansion of the membranes and to prevent high pressures from reaching the membranes.

As can be seen in FIGS. 6A and 14, the O-ring seals 144, 244 and 252 restrain each of the membranes respectively on the tool. The top ends of both membranes 20 and 22 are doubled over the O-ring 144 and the membranes and O-ring are then placed in the recess 142 and the membrane retainer 112 and threaded nut 110 compress O-ring/membrane assembly. The membrane retainer 112 leaves only enough of a slot to allow the membranes to exit the recess. The inner membrane 20 is first doubled over the O-ring 244 and then the membrane/O-ring assembly are then placed in the recess 242 and the middle ring or capture sleeve 212 is slipped over the O-ring and membrane to compress the O-ring/membrane assembly and to provide only enough of a slot for the doubled over membrane to exit the recess. The outer membrane 22 is similarly wrapped around the O-ring 252 and the membrane and O-ring are then placed in the recess 254 and the outer ring 214 is slipped over the middle ring and nut 204 is threaded to retain the entire assembly in place. The principle used is that the initial seal for fluid tightness is accomplished with the compression provided by the rings. Additional tension on the membrane caused by the casting compound or the working fluid injection causes the membrane to try to pull the large O-ring through the small slot. The shape of the slot inhibits O-ring rotation and friction of the initial compression prevents the membrane from slipping out around the O-ring.

Working Fluid Reservoir

The requirement that the membranes not see high differential pressures makes the use of working fluid reservoir (piston chamber) 30 necessary. This allows the strict limitation of the amount of fluid that can enter the membrane and cause its inflation. Without such a feature, the membranes would rupture from even a slight increase of differential pressure if volume was available to inflate the membranes.

Isolation/Mix Sequence Valve

Figure 10:
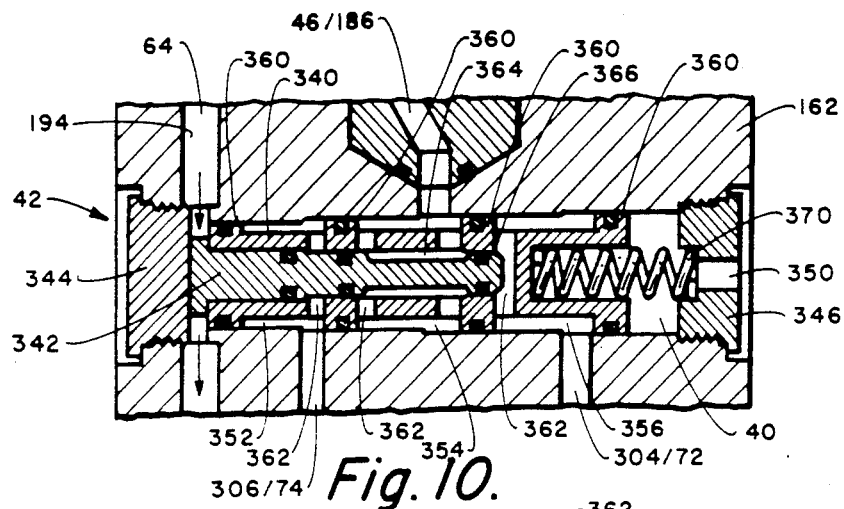
FIG. 10 is a cross-sectional view taken along line 10—10 of FIG. 9 and enlarged to show the relationship of the isolation and mix sequence valve and operating fluid at their initial condition with the flow passage for the flow of riser and catalyst therethrough.
Figure 13:
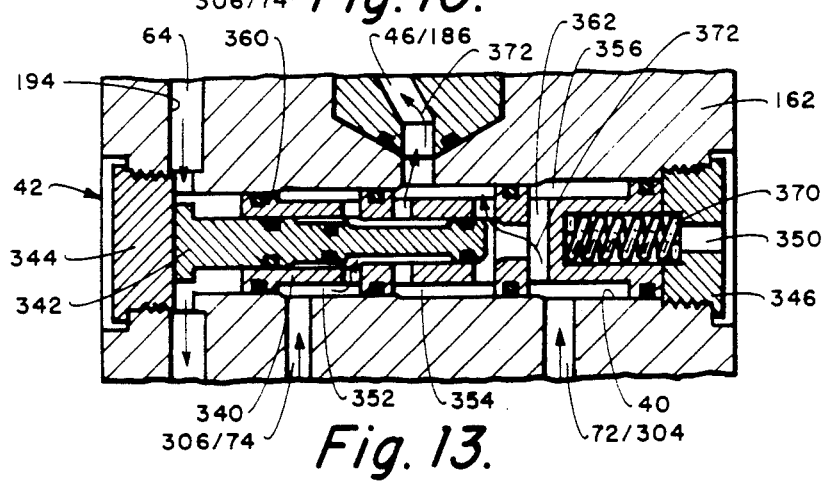
FIG. 13 is an enlargement of the area encircled by the arrow 13 and corresponds to FIG. 10, but showing another position of part of the isolation and mix sequence valve since the casting compound is entering the double membranes.

As shown in FIGS. 9, 10 and 13, the isolation/mix chamber 40, previously mentioned, transverse bore, contains the isolation/mix valve 42 which comprises a moveable sleeve 340 which telescopes over a stationary valve plug 342 and both are held in the chamber by threaded end caps 344 and 346. The valve plug 342 is attached to the end cap 344 and thus held stationary while the other end cap 346 contains a bore 350 providing an ambient reference pressure for the isolation/mix valve 42.

The sleeve 340 has three portions 352, 354 and 356 of reduced diameter forming cylindrical passages separated by four valve lands 360. The lands contain suitable O-ring seals which engage the bore wall to provide a slideable, but fluid tight, relationship between the reduced portions, the reservoir passages 72/304 and 74/306, and the output passage 186/46 to the mixing chamber. The sleeve also has four transverse bores 362, one of which opens into the reduced portion 352, two opening into the reduced portion 354 and one opening to reduced portion 356. The valve plug 342 also has a reduced portion 364 located inwardly of, and spanning, one centrally located land 360 and the two reduced portions 352 and 354 of the sleeve. Suitable O-ring seals provide a fluid tight relationship between the reduced portion of the plug and the passages. Furthermore, the end of the plug seals an axial passage 366 so that in the position such as shown in FIG. 10, the passages 72/304 and 74/306 from the reservoirs and the passage 186/46 to the mixing chamber are closed to the flow of fluid. (Passage 366 is shown open in FIG. 13.)

The end of the valve plug 342 and sleeve 340 provide a passage at the end of the valve chamber. As mentioned before, this passage is a continuation of passage 64 for the working fluid, and is always open to the working fluid pressure. The sleeve 340 is biased by a spring 370 in a direction so as to prevent the flow of fluid from the reservoirs and to the mixing chamber and is also responsive to ambient fluid pressure by the axial bore 350 in the end cap 346. When the pressure of the working fluid is increased, the working fluid pressure overcomes the ambient pressure and the bias of the spring 370 urge the sleeve in position to open the passages from the reservoirs and to the mixer. This is shown in FIG. 13 and is represented by the arrows 372.

This valve 42 provides two functions. The first function is the separation of the resin and catalyst during the running of the tool. Such a separation is necessary because the tool can take several hours to reach its intended location, whereas if the two components were allowed to mix, a solid plug would form within five minutes after mixing. The second function of this valve is to make the tool insensitive to depth to prevent inadvertent mixing of the resin and catalyst. One source of depth dependent differential pressure would be due to the possibility of air in the mixing chamber. Another source of the depth dependency is the static head created by the filling of the drill pipe with the drill pipe fluid 18, which increases as the depth of the tool increases. The valve must not be capable of prematurely opening due to this increase in pressure. This valve 42, on the other hand, senses the ambient pressure from the well bore through the end cap bore 350 and, thus, this ambient pressure plus the bias spring combine to keep the valve 42 shut during running and final positioning. This provides protection against the differential pressure and the static head pressure as mentioned above.

Thus, when the proper operating pressure of the working fluid is reached, the valve 42 shifts and allows the resin and catalyst to enter the mixing chamber, and when the casting compound injection phase is over, the drill pipe fluid pressure is decreased so that the bias spring will shut the valve so that the mixed casting compound can not flow back into the reservoirs. Using the combination of ambient pressure and spring pressure, a low back pressure valve is accomplished. The valve is configured also so that it can be easily removed for cleaning after each use of the tool.

Sequence Valve

Figure 18:
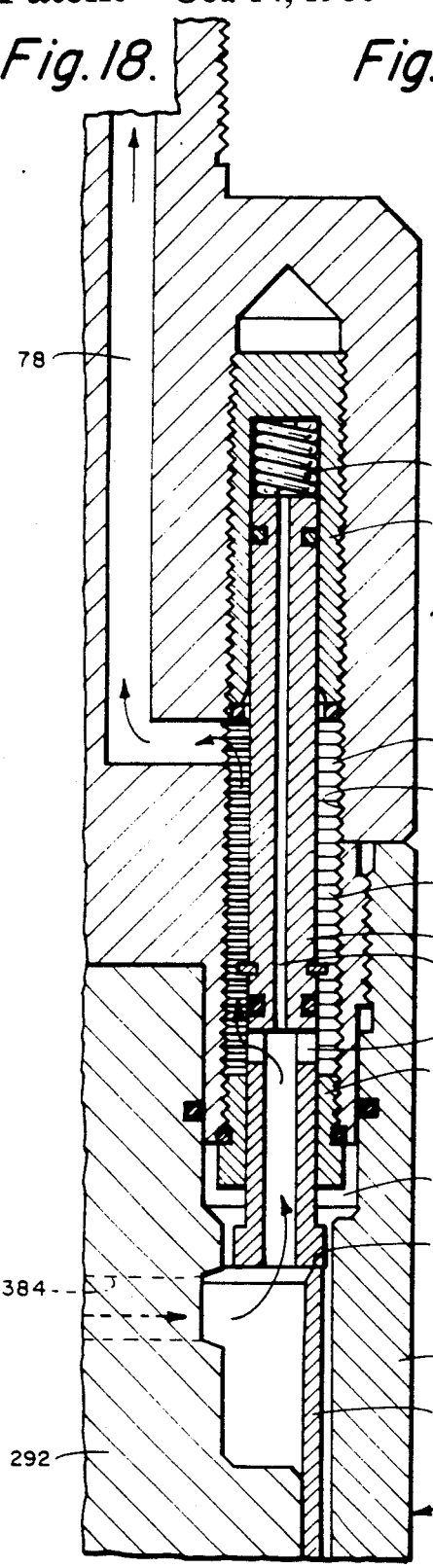
FIG. 18 is an enlargement of the area encircled by the arrow 18 in FIG. 16 to show the details thereof.
Figure 19:
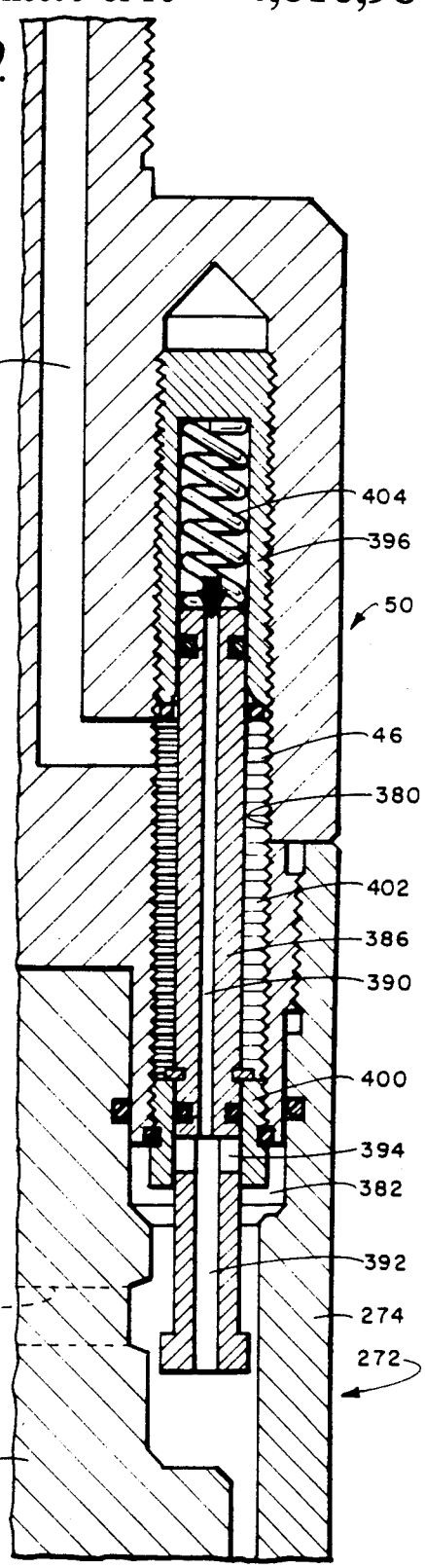
FIG. 19 is similar to FIG. 18, but showing the sequence valve in a second position.
Figure 20:
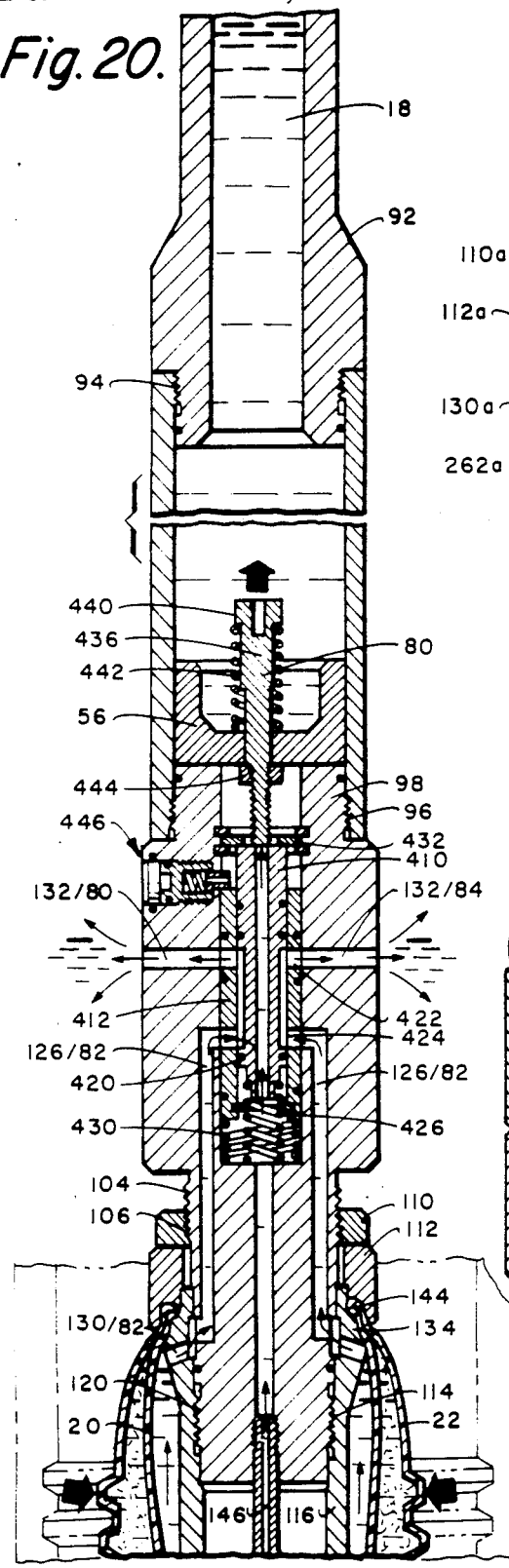
FIG. 20 illustrates the collapsing of the double membranes with the tool ready to be retrieved to the surface.

FIGS. 16, 18, and 19 show the sequence valve 50 in the sequence valve chamber 46. The sequence valve chamber comprises a bore threaded at 380 in the lower portion 162 of the third body section and a space 382 between the tubular member 272/274 and the cylinder 292, and the sequence valve is positioned such that it opens and closes passage 78 to the flow of working fluid 60. The passage 78 is formed by a peripheral groove 384 in the upper part of the cylinder 292 which connects with passage 64 at the lower end of the lower portion 162. See FIGS. 7, 12 and 14. The sequence valve 50 diverts all of the working fluid 60 remaining in the working fluid reservoir 30 to the space between the main tool body and the inner membrane 20 after the working fluid has forced all of the resin and catalyst from the reservoirs through the mixing chamber and into the space between the membranes 20 and 22.

The sequence valve 50 comprises a slideable piston 386 with a small axial bore 390, a lower larger counter bore 392, and a transverse bore 394 near the termination of the counter bore. The piston is slideable within a pair of spaced apart sleeves 396 and 400 threaded in the threads 380, which also define a chamber 402 therebetween. Suitable O-ring seals provide a slideable fluid tight relationship between the piston and the sleeves. The piston is biased by spring 404 toward a closed position, that is, one sleeve 400 serves to close the transverse bore 394 to prevent the working fluid in the peripheral groove 384 from flowing to the output passage 78. The spring closes the transverse bore 394 to the working fluid, so long as the working fluid is being used to force the catalyst and resin out of the reservoirs, and is pressure balanced via small axial bore 390 against any pressure within the chamber from the working fluid and, thus, will remain closed until mechanically moved against the spring bias to open the axial bore 392 to the chamber 402. The means for mechanically moving the piston is the top edge 406 of the sleeve 286. Thus, the passage 78 is open to the chamber 382 for the flow of working fluid to enter the space behind the inner membrane 20.

Dump Valve

The dump valve 54, shown in FIGS. 6, 11, 15, partly in 17, and 20, comprises an inner and outer sleeve 410 and 412 within the dump valve chamber 52. The inner sleeve 410 is slideable with the outer sleeve 412 and is axially bored at 414 to allow the continuous flow of working fluid 60 from the working fluid reservoir 30 and is provided with a reduced portion midway of its outer periphery to provide an inner valve chamber 420 within the outer sleeve. The outer sleeve 412 is slideable within the valve chamber 52 and is provided with two ports 422 and 424 spaced apart such that the passage 126 will open to passage 132 when the inner valve chamber 420 is moved at the selected time. (Passage 126, including radial passage 130, correspond to passage 82, and passage 132 corresponds to passage 84, as previously mentioned.)

Both sleeves are biased by helical springs 426 and 430 and are insensitive to the pressure of the working fluid due to the pressure balanced nature of the sleeves. Upward movement of both sleeves is stopped by the lock ring retainer assembly 432.

The first or normal position of the sleeves is such that passages 126 and 132 are closed to the flow of fluid.

The inner sleeve is provided with a stop in the form of a stop washer 434 which will cause the inner sleeve and the outer sleeve to move together against the spring bias, but will allow the inner sleeve to move in the direction of the working fluid chamber independently of the movement of the outer sleeve.

Figure 17:
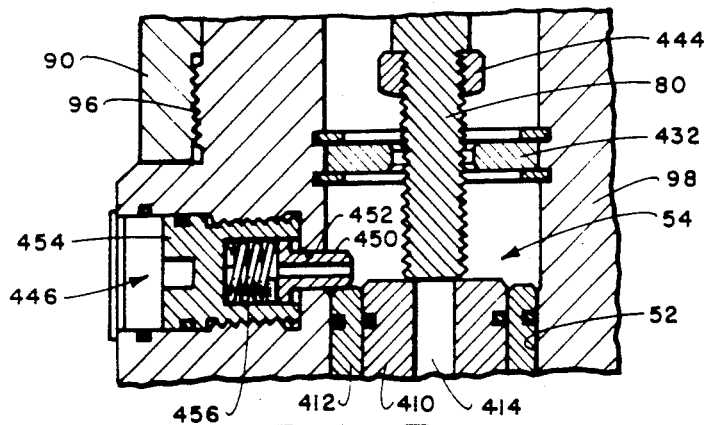
FIG. 17 is an enlargement of the area encircled by the arrow 17 in FIG. 15 to show the details thereof.

The inner sleeve is engageable and moveable by the dump valve actuator 80 carried by the isolation piston 56. FIG. 11 illustrates the dump valve 54 in its normal position as the isolation piston 56 urges the working fluid 60 out the working pressure reservoir 30. The dump valve actuator 80 is centrally located in the isolation piston and comprises a plunger 436 with an enlargement or head 440. The actuator is biased by helical spring 442 toward its upward position, but is subject to movement against the spring bias in response to drill fluid pressure when the isolation piston reaches its full stroke. The uppermost position of the dump valve actuator is determined by a threaded nut 444 on the actuator below the piston 56. FIGS. 15 and 17 illustrate the dump valve actuator subject to the drill fluid pressure 18 having urged the two sleeves 410 and 412 downward against the spring bias on the sleeves to a position where a spring actuated latch 446 engages the top of the outer sleeve and cocks the valve, i.e., holds the outer sleeve in an intermediate position. This spring actuated latch 446 comprises a plunger 450 slideable within a bore 452 and within a threaded end cap 454, which also contains bias spring 456. When the dump valve is in its normal position, the plunger is held retracted by the outer sleeve 412, but when the end of the sleeve passes beyond the bore 452, the spring 456 urges the plunger radially to lock the inner sleeve in its lowermost position. When the pressure is reduced in the drill pipe, the bias of the spring 442 on the dump valve actuator overcomes the fluid pressure on the actuator and moves the actuator upwardly relative to the isolation piston to the position represented in FIG. 20. At that time, since the outer sleeve 412 is locked from upward movement, the spring bias on the inner sleeve 410 urges the inner sleeve upwardly positioning the ports 422 and 424, and thus passages 126/82 and 132/84, to ambient pressure.

As thus described, it can be seen that the dump valve 54 is a three position tool. The first position is a complete blockage of fluid flow by the sliding sleeves 410 and 412. At the time when the membranes 20 and 22 are fully inflated, the isolation piston 56 reaches its full stroke and the dump valve actuator 80 extends to shift the dump valve to its intermediate position. In this position, the inner and outer sleeves are at their lowermost position and the outer sleeve will stay in the lowest position by reason of the latch 446. This positions port 422 in line with passage 132/84, and port 424 in line with passage 126/82. After the casting compound is cured, the drill fluid pressure on the isolation piston is released and the dump valve actuator spring 442 retracts the dump valve actuator. The inner sleeve of the dump valve now follows the dump valve actuator by action of the bias spring 426 returning to its original position and aligning chamber 420 behind ports 422 and 424 to allow the working fluid to exit the tool. After recovery of the tool, the latch 446 is released and the dump valve is ready to run again.

This dump valve is important because only a very small pressure is required to inflate the membranes and must be protected form the static head pressures of the running string. To do this, the dump valve accomplishes the dumping of the working fluid after the impression is made by opening up a port for the working fluid to escape out of the tool. It is not possible to escape into the tool unless a spring retractor is used on the isolation piston. With a spring retractor, the static head fluctuations during retrieval of the tool could be overcome. The dump valve also has the advantage of greatly shortening the length of the tool.

Isolation Piston

The isolation piston 56 does three things. It limits the volume of fluid available to operate the tool to that amount that will not rupture the membranes. It protects the cleanliness of the tool by acting as a barrier to the drill string contaminants. It also carries a dump valve actuator 80 which deflates the membranes when the pressure is bled from the drill string bore.

As mentioned above, power to operate the tool comes from fluid pressure transmitted through the stand of drill pipe attached to the top of the tool. The type of fluid in the column is not significant as it is prevented from entering the workings of the tool by the isolation piston 56. During operation of the tool, it is only necessary to fill the drill string with water or other fluid and bring that fluid to a set operating pressure. After a specified time, the pressure is bled off. When the drill string is being pulled to the surface, the static head on the isolation piston can vary. The membranes must be fully isolation from this pressure increase because of its low pressure requirement for inflation. This isolation is accomplished by the isolation piston. The dump valve actuator 80 is carried by the isolation piston so that its position accomplishes a timing function. Because the pressure inside the tool drops to 0 psi during the membrane inflation and cure cycle, it is not possible to use a pressure signal to operate the three stage dump valve. Therefore, the dump valve actuator 80 is used to cock the dump valve and bias spring 442 encircling the valve actuation stem is used to move the dump valve actuator away from the dump valve and allow it to go to its final dump position. Spring is strong enough to overcome a reasonably expected static pressure which is greater on the inside of the tool than on the outside.

Reservoir Compression Piston

In the simplified illustration of FIGS. 1–4, a separate piston is shown to provide the driving force to expel the casting compound components from their reservoirs. In the actual tool of FIGS. 5–21, concentric cylinders, with moveable pistons, and with areas proportional to the desired mix ratio, are used and the hydraulic force acts directly on those pistons. Working fluid 60 is used to operate this system and it transmits the pressure required to force the casting compound through the isolation/mix valve 42 and the mixing chamber 44.

Catalyst and Resin

For use in temperatures from 35 degrees to 80 degrees, a two part silicone casting compound is recommended. This compound is made by Hastings Plastics and has a cure time of 5 minutes at room temperature and 30 minutes at 35 degrees. No noticeable exothermic reaction takes place with this compound, which makes it suited for low temperature applications. The casting compound forms dimensionally stable, pliable mold upon hardening. This mold is strong enough to be recovered by the tool and yet it is easily broken apart if the resin should get into the subsea equipment. This casting compound does not adhere to other materials, and this makes it very easy to remove the membranes and to clean up the tool after use. In addition, the material will not adhere to downhole equipment in the event of a rupture of the membranes. The casting compound is mixed in a 7 to 1 ratio. To accomplish this, two concentric cylinders are used with an area ratio of 7 to 1. This allows for minimum tool length and the smallest possible required diameter.

Resin Chamber

The reservoir 34 for the unmixed resin is an annular cavity with sleeve 286 for the outer boundary and a piston rod 284 for the inner boundary. The outer sleeve 286 and the piston rod 284 are removeable from the piston 66 so that assemblies of different lengths can be made for different volume requirements. A solid annular cylinder 292 which is mounted to the tool body and over which the sleeve fits is used to displace the resin. Driving force to displace the resin and catalyst through the mixing chamber 44 comes when the working fluid travels around the outside of the resin reservoir via the space 310/64 which forms a passage for the working fluid and acts on the end of the piston 66. This causes an upward motion of the reservoir which displaces the resin out passage 304 in the inner cylinder 292.

Catalyst Chamber

The inner bore 294 of the cylinder 292 and the piston rod 284 form the catalyst reservoir 36. This is possible because the catalyst is added to the tool after assembly. By doing this it is possible to prevent the catalyst from spilling into the resin reservoir and solidifying the resin too soon. As the resin reservoir is forced upward, the catalyst is forced into the mixing chamber 44 through a passage 306 at the top of the catalyst chamber.

Mixing Chamber

The mixer 170 comprises commercially available static mixing elements within a cylindrical container 464 (FIG. 14) that combine the catalyst and the resin by passing them through a labyrinth path. The static mixers can be of either the cleanable or the disposable variety. The mixer elements are commercially available spiral type mixers such as sold under the trademark "Spiral Mixers" by TAH Industries, Inc., P. 0. Box 178, Imlaystown, NJ 08526. See catalogue #105.

SEQUENCE DESCRIPTION

Prior to Operation

1. Load the resin reservoir 34 with resin.
2. Screw the outer body section tubular members 272 and 276 and bull nose 14 containing the resin reservoir onto the lower main body section 162.
3. Install a mixing element 170 into the mixing chamber 44 and screw the fourth body section 156 into the upper end of the lower main body section 116.
4. Fill the catalyst reservoir 36 using the fill port 466 and vent ports 470 (four such ports although only two are shown in FIG. 7). Close ports 466 and 470.
5. Double the membranes 20 and 22 over with an O-ring 144 inside the center fold.
6. Pull the middle of the membrane with the O-ring 144 over the upper membrane retainer conical portion 134. Slide the upper membrane capture sleeve 110 over the membranes and tighten the upper membrane capture nut 112.
7. Hold the membranes out of the way and screw the lower main body 156 with the casting compound reservoir installed into the bottom of the impression support tube 116.
8. Stretch the lower end of the inner membrane 20 over the inner membrane retainer sleeve 210, install the O-ring 244 over the membrane 20 and in the groove, double the edge of the membrane over the O-ring 244 and slip the inner membrane capture sleeve 212 up over the inner membrane.
9. Install the membrane preload/casting compound channel screws (inserts) 180 through the inner membrane capture sleeve 212 and into the lower main body. Tightening these screws preloads the inner membrane retainer and provides a path (bore) 176 for the casting compound to take from the mixing chamber to the space between the membranes.
10. Stretch the outer membrane 22 over the inner membrane capture sleeve 212, install the O-ring 246 in the groove, fold the membrane back over the O-ring and slide the outer membrane capture sleeve over the outer membrane. Tighten the lower membrane capture nut.
11. Screw the dump valve catch mechanism (spring actuated latch) 446 all the way in.
12. Remove the fill and vent ports for the working fluid reservoir 30 chamber and flush through with working fluid until void of air. Replace the vent plug and fill with working fluid until the isolation piston 56 has reached the top of the working fluid reservoir. (If the volume of working fluid must be restricted to less than the full capacity of the tool, the height of the isolation piston can be calculated and its position measured.) Replace the working fluid fill plug.
13. The tool is now ready to run. Screw it onto the running string via adaptor 92 and run it down to the desired position.

Glue Injection and Mixing

1. Fill the running string with water.
2. Attach a pressure source to the top of the string and apply 1500 psi to the top of the running string.

3. The working fluid will pressurize the outside of the resin reservoir and try to force it upward.

4. When the pressure reaches the setting of the isolation/mixing valve, the valve will open and the catalyst and resin will pass through the valve and into the mixing chamber.

5. As the resin reservoir travels, it forces the resin and catalyst through the mixing chamber and into the space between the inner and outer membranes. The outer membrane retainer is shaped so that it forces the casting compound into a uniform distribution around the tool.

Membrane Inflation

1. The last travel of the resin reservoir pushes the sequence valve into its membrane inflation position. At this time the working fluid is directed to the space between the tool and the tool and the membrane and inflates the membrane against the surface to be profiled.

2. The isolation piston pushes the working fluid out of the tool until it bottoms out on the body. At that time, the isolation piston stops and the dump valve actuator goes to its second position and cocks the dump valve.

3. Pressure is held on the tool until the casting compound cures.

Membrane Deflation and Removal

1. Pressure is bled off of the running string.

2. As this happens, the dump valve actuator retracts and the dump valve vents the working fluid used to inflate the membrane out of the tool.

3. When venting is complete, the tool is recovered to the surface.

Final Impression Evaluation

1. When the tool reaches the surface, the outer membrane is cut away.

2. The inner membrane is cut away from the tool at both ends and the impression is slipped off of the tool.

3. The inner membrane is removed from the tool and the impression is ready for use.

We claim:

1. A tool for taking the impression of an area of the internal bore of a tubular member or of a joint between tubular members joined together comprising,
   a body member of a diameter to enter the bore,
   a pair of resilient membranes each surrounding the outer periphery of said body member,
   means in said body member for directing a casting compound between said membranes and for inflating and expanding said membranes into engagement with said bore, and
   means for deflating said expanded membranes to allow said tool to be withdrawn from said bore.

2. The tool as claimed in claim 1 wherein said means for directing casting compound between said membranes comprises working fluid under pressure.

3. The tool as claimed in claim 2 wherein the volume of said working fluid under pressure is limited to a predetermined amount.

4. The tool as claimed in claim 3 wherein said means for inflating and expanding said membranes against said bore is fluid under pressure.

5. The tool as claimed in claim 4 wherein the volume of said working fluid under pressure for inflating and expanding said membranes is limited to a predetermined amount.

6. The tool as claimed in claim 5 wherein said working fluid inflating and expanding said membranes is directed outside said tool to allow said membranes to contract.

7. The tool as claimed in claim 6 including a working fluid reservoir for containing said working fluid and to limit the amount of said working fluid, and wherein said working fluid directing casting compound between said membranes and the working fluid for inflating and expanding said membranes is from the reservoir.

8. The tool as claimed in claim 7 including piston means in said reservoir and responsive to fluid under pressure from another source for pressurizing said working fluid.

9. The tool as claimed in claim 8 wherein said fluid under pressure from another source is drill pipe fluid, said tool being connected to a string of drill pipe.

10. The tool as claimed in claim 9 further including at least one resin reservoir and at least one catalyst reservoir for containing resin and catalyst to form the casting compound, said resin and catalyst in their respective reservoir remaining separated until subjected to said working fluid for directing the casting compound between said membranes.

11. The tool as claimed in claim 10 further including a mixer in a path between said reservoir and said membrane.

12. The tool as claimed in claim 11 wherein said means for directing the casting compound between the membranes comprises an isolation/mix sequence valve located between said mixer and said reservoir,
    said valve in a first position isolating the reservoirs from the mixer and in a second position opening said reservoirs to the mixer,
    said valve being moveable from said first position to said second position in response to an increase in fluid pressure from said drill pipe fluid.

13. The tool as claimed in claim 12 wherein said means for directing the working fluid for inflating and expanding the membranes comprises a sequence valve in a path between the membranes and the source of working fluid.

14. The tool as claimed in claim 13 wherein the means for deflating the expanded membranes comprises a dump valve between said membranes and a path in said body member existing to the internal bore, said dump valve being closed to said path until actuated by a decrease in fluid pressure in said drill pipe.

* * * * *